United States Patent
Iwamoto

(10) Patent No.: US 9,757,985 B2
(45) Date of Patent: Sep. 12, 2017

(54) SYSTEM AND METHOD FOR PROVIDING A GEAR SELECTION INDICATION FOR A VEHICLE

(71) Applicant: Honda Motor Co., Ltd., Tokyo (JP)

(72) Inventor: Jun Iwamoto, Plain City, OH (US)

(73) Assignee: Honda Motor Co., Ltd., Tokyo (JP)

(*) Notice: Subject to any disclaimer, the term of this patent is extended or adjusted under 35 U.S.C. 154(b) by 207 days.

(21) Appl. No.: 14/865,036

(22) Filed: Sep. 25, 2015

(65) Prior Publication Data
US 2017/0088048 A1  Mar. 30, 2017

(51) Int. Cl.
*B60Q 9/00* (2006.01)
*B60R 1/00* (2006.01)
*B60C 9/00* (2006.01)
*G06K 9/00* (2006.01)

(52) U.S. Cl.
CPC .............. *B60C 9/00* (2013.01); *B60R 1/00* (2013.01); *G06K 9/00832* (2013.01)

(58) Field of Classification Search
CPC ......... B60Q 9/00; G06K 9/00832; B60R 1/00
See application file for complete search history.

(56) References Cited

U.S. PATENT DOCUMENTS

| | | | |
|---|---|---|---|
| 4,199,747 A | 4/1980 | Miller et al. | |
| 5,552,761 A | 9/1996 | Kazyaka | |
| 7,289,645 B2 | 10/2007 | Yamamoto et al. | |
| 8,049,722 B2 | 11/2011 | Kumon | |
| 8,255,133 B2 | 8/2012 | Ahn | |
| 8,364,357 B2 | 1/2013 | Kraemer et al. | |
| 8,849,506 B2 | 9/2014 | Suzuki | |
| 2002/0041260 A1 | 4/2002 | Grassmann | |
| 2006/0129297 A1 | 6/2006 | Kim | |
| 2010/0305819 A1 | 12/2010 | Pihlajamaki | |
| 2013/0120129 A1 | 5/2013 | Tippelhofer et al. | |
| 2015/0002620 A1* | 1/2015 | Shin ............... | G06K 9/00805 348/36 |

FOREIGN PATENT DOCUMENTS

EP   2075493   7/2009

* cited by examiner

*Primary Examiner* — Nam Pham
(74) *Attorney, Agent, or Firm* — Rankin, Hill & Clark LLP

(57) ABSTRACT

A system and method for providing a gear selection indication for a vehicle that includes receiving an image of a gear shifting region of the vehicle from a vehicle camera system. The system and method also include processing the image of the gear shifting region into processed image data. Additionally, the system and method include determining a currently selected gear of a plurality of gears of a transmission unit of the vehicle based on the processed image data. The system and method further include outputting the currently selected gear of the plurality of gears. Outputting the determined currently selected gear includes at least one of: communicating the currently selected gear to a gear selection indicator that presents the determined currently selected gear, and communicating the currently selected gear to vehicle systems.

20 Claims, 6 Drawing Sheets

SYSTEM AND METHOD FOR PROVIDING A GEAR SELECTION INDICATION FOR A VEHICLE

BACKGROUND

Generally, with respect to a vehicle with manual transmissions, gear selection indicators (e.g., LED indicators) can provide an output to a driver of the vehicle that pertains to a currently selected gear. A drawback to systems that provide such an output is that the output can only be provided once a gear is determined to be fully selected upon a transmission speed of the vehicle being stable. In other words, an output of a gear switching from neutral to reverse, neutral to first gear, or one gear to another gear can only be provided when a clutch of the vehicle manual transmission system is fully engaged in order to change the indication of a gear that has been selected by the driver. Therefore, there is a lag (e.g. 1-2 seconds) between the driver selecting the intended gear with a gear shift lever, until a display is updated to show the selected gear. The lag thereby makes the display of the selected gear less useful, especially in the event that the driver is driving a vehicle with many gears, the driver is shifting through the gears quickly, and/or the driver wants to quickly confirm the currently selected gear during marginal driving conditions. Another drawback of such systems occurs when the clutch of the vehicle becomes disengaged, since the transmission speed deviates from the normal gear speed which results in a gear selection indicator presenting a blank output until the clutch is reengaged into a gear.

BRIEF DESCRIPTION

According to one aspect, a computer-implemented method for providing a gear selection indication for a vehicle is provided that includes receiving an image of a gear shifting region of the vehicle from a vehicle camera system. The method also includes processing the image of the gear shifting region into processed image data. Additionally, the method includes determining a currently selected gear of a plurality of gears of a transmission unit of the vehicle based on the processed image data. The method further includes outputting the currently selected gear of the plurality of gears. Outputting the determined currently selected gear includes at least one of: communicating the currently selected gear to a gear selection indicator that presents the determined currently selected gear, and communicating the currently selected gear to vehicle systems.

According to a further aspect, providing a gear selection indication for a vehicle is provided that includes a gear selection indication application that is executed on an electronic control unit of the vehicle. The system also includes an image reception module that is included as a module of the gear selection indication application that receives an image of a gear shifting region of the vehicle from a vehicle camera system. Additionally, the system includes an image processing module that is included as a module of the gear selection indication application that processes the image of the gear shifting region into processed image data. The system further includes a gear selection determinant module that is included as a module of the gear selection indication application that determines a currently selected gear of a plurality of gears of a transmission unit of the vehicle based on the processed image data. The system additionally includes a gear selection output module that is included as a module of the gear selection indication application that outputs the currently selected gear of the plurality of gears. The gear selection output module communicates the currently selected gear to at least one of: a gear selection indicator that presents the determined currently selected gear, and to vehicle systems According to still another aspect, a computer readable storage medium storing instructions that, when executed by a processor, perform actions, including receiving an image of a gear shifting region of the vehicle from a vehicle camera system. The instructions also include processing the image of the gear shifting region into processed image data. Additionally, the instructions include determining a currently selected gear of a plurality of gears of a transmission unit of the vehicle based on the processed image data. The instructions further include outputting the currently selected gear of the plurality of gears. Outputting the determined currently selected gear includes at least one of: communicating the currently selected gear to a gear selection indicator that presents the determined currently selected gear, and communicating the currently selected gear to vehicle systems.

DETAILED DESCRIPTION

Figure 1:
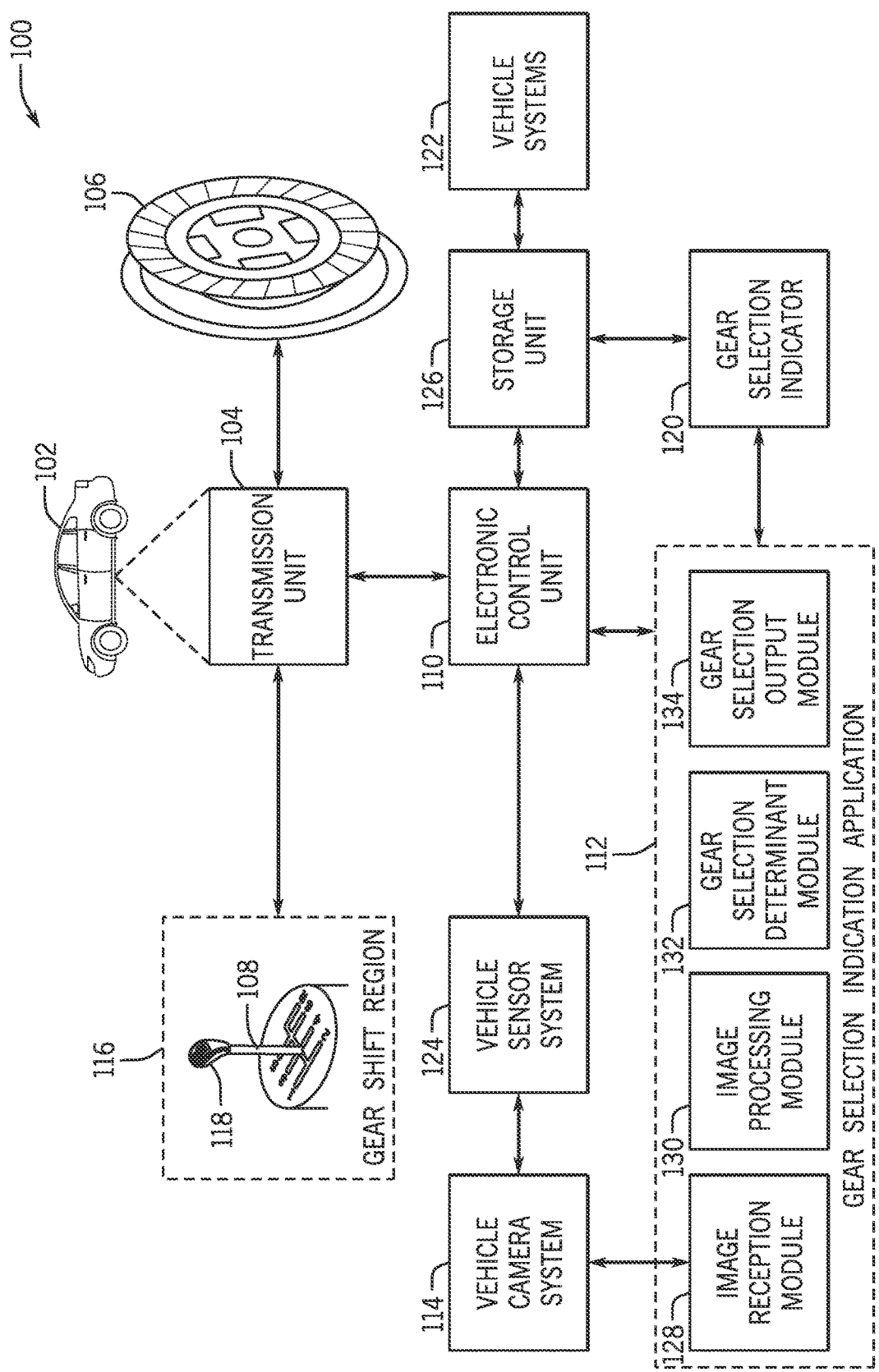
FIG. 1 is a schematic view of an operating environment for implementing systems and methods for providing a gear selection indication for a vehicle according to an exemplary embodiment.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database", as used herein can refer to table, a set of tables, and a set of data stores and/or methods for accessing and/or manipulating those data stores. Some databases can be incorporated with a disk as defined above.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers. In some embodiments, a "portable device" could refer to a remote device that includes a processor for computing and/or a communication interface for receiving and transmitting data remotely.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an operating environment 100 for implementing systems and methods for providing a gear selection indication for a vehicle according to an exemplary embodiment. The components of the environment 100, as well as the components of other systems, hardware architectures, and software architectures discussed herein, can be combined, omitted, or organized into different architectures for various embodiments.

Generally, the environment 100 includes a vehicle 102 with a transmission unit 104. In an exemplary embodiment, the transmission unit 104 is a manually operated transmission that uses a driver-operated clutch (clutch) 106 and a gear shift lever 108. In an alternative embodiment, the transmission unit 104 can include a semi-manually or automatically operated transmission unit. The vehicle 102 also includes an electronic control unit 110 (ECU) that executes or accesses a gear selection indication application 112. As discussed in more detail below, the gear selection indication application 112 can use camera based detection provided by a vehicle camera system 114 to capture images of a gear shifting region 116 of the vehicle 102 that includes the gear shift lever 108.

In one embodiment, as described in more detail below, one or more cameras (not shown) of the vehicle camera system 114 capture one or more images of the gear shifting region 116. The gear selection indication application 112 can be configured to receive the one or more images upon predicting that one of a plurality of gears (e.g., predetermined number of gears (n number of gears)) that can be selected by a driver (not shown) using the gear shift lever 108 of the transmission unit 104 of the vehicle 102. The gear selection indication application 112 can efficiently process the image(s) received from the camera(s) of the vehicle camera system 114 into processed image data that includes a detected location of the driver's hand and/or a location of a gear shift knob 118 of the gear shift lever 108 within the gear shifting region 116. The gear selection indication application 112 utilizes the processed information to determine a currently selected gear of the plurality of gears based on the processed image data. The gear selection indication application 112 accordingly provides a gear selection indication via a gear selection indicator 120 to the driver of the vehicle 102 to present the currently selected gear of the plurality of gears of the transmission unit 104 (i.e., the gear currently engaged by the clutch 106 of the transmission unit 104).

With reference to the components of the vehicle 102, the ECU 110 includes internal processing memory (not shown), an interface circuit (not shown), and bus lines (not shown) for transferring data, sending commands, and communicating with vehicle systems 122. The ECU 110 can also include a communications device (not shown) for sending data internally in the vehicle 102 and externally to connected devices. The communication device included within the ECU 110 is capable of providing wired or wireless computer communications utilizing various protocols to send/receive electronic signals internally to the vehicle camera system 114, the vehicle systems 122, and/or a vehicle sensor system 124. Additionally, the communication device of the ECU 110 is operably connected for internal computer communication via a bus (e.g., a Controller Area Network (CAN) or a Local Interconnect Network (LIN) protocol bus) to facilitate data input and output between the ECU 110, the vehicle camera system 114, vehicle systems 122, and/or the vehicle sensor system 124.

In some embodiments, the ECU 110 can be operably connected to a storage unit 126 that can store one or more operating systems, applications, associated operating system data, and the like that are executed by the ECU 110. In an exemplary embodiment, the storage unit 126 can store the gear selection indication application 112 to be executed by the ECU 110. In some embodiments, the ECU 110 and the storage unit 126 can also be connected to a head unit (not shown) of the vehicle 102. The head unit can be connected to one or more respective display devices (not shown) (e.g., display screens), respective audio devices (not shown) (e.g., audio system, speakers), respective haptic devices (not shown) (e.g., haptic steering wheel), etc. that are utilized to provide a human machine interface (HMI) (not shown) to provide the driver of the vehicle 102 with various types of information.

The vehicle systems 122 can include (individual vehicle systems not shown), but are not limited to, a vehicle navigation system, a vehicle lighting system, a vehicle HVAC system, a vehicle audio system, a vehicle video system, a vehicle infotainment system, a vehicle telecommunications system, and the like. As discussed below, the vehicle systems 122 can communicate with the gear selection indication application 112 to send and receive data signals that are utilized by the application 112 and the vehicle systems 122.

The vehicle sensor system 124 can include one or more sensors (individual sensors not shown), for example, vehicle speed sensors used to determine a speed of the vehicle, vehicle RPM sensors used to determine revolutions per minute (RPM) of an engine (not shown) of the vehicle 102, and/or a vehicle clutch actuation sensor used to determine when the clutch 106 is actuated by the driver of the vehicle 102, among others. Additional vehicle sensors can include, but are not limited to vehicle acceleration sensors, vehicle angular velocity sensors, clutch pedal sensors, brake sensors, steering wheel angle sensors, vehicle locational sensors (e.g., GNSS coordinates), vehicle directional sensors (e.g., vehicle compass), throttle position sensors, respective wheel sensors, anti-lock brake sensors, camshaft sensors, among other sensors. As discussed below, the vehicle sensor system 124 can communicate with the gear selection indication application 112 to send data signals to the ECU 110 that are utilized by the application 112.

Figure 3:
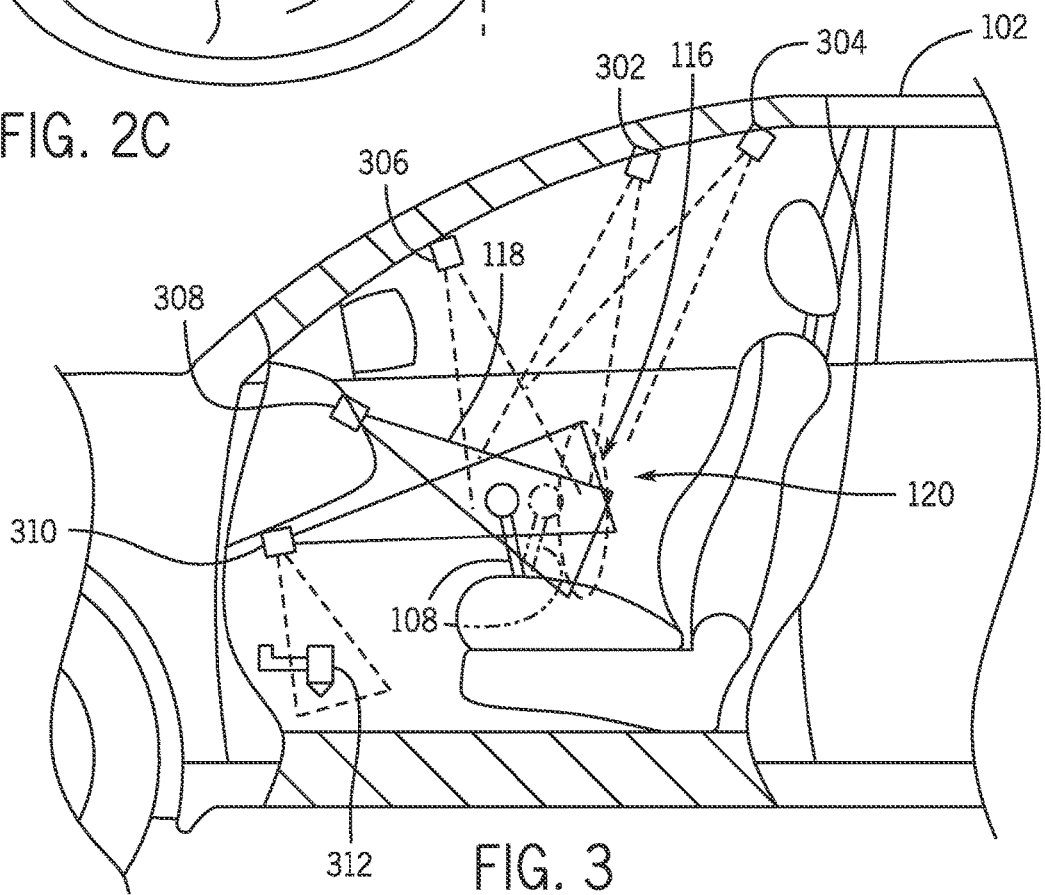
FIG. 3 is an schematic view of the vehicle that includes one or more cameras of a vehicle camera system that are provided according to an aspect of the present application.

The transmission unit 104 of the vehicle 102 can regulate torque transfer from the engine to a transmission (not shown) of the vehicle 102 based on the actuation of the clutch 106 by the driver of the vehicle 102 using a clutch pedal (shown in FIG. 3). In an exemplary embodiment, the transmission unit 104 can include a plurality of gears. The plurality of gears can include a predetermined number of gears (n number of gears) that can be selected by the driver using the gear shift lever 108. In one embodiment, the clutch 106 can be actuated for the transmission unit 104 to be selected into a neutral mode or be selected into a reverse gear and/or 1 to n gears of the plurality of gears based on the number of gears that the transmission unit 104 includes.

The gear shift lever 108 can be included within the gear shifting region 116 of the vehicle 102. The gear shifting region 116 can include a predetermined area that surrounds and includes the gear shift lever 108 in which the one or more cameras of the vehicle camera system 114 can be configured to capture one or more images (e.g., still, video) of the driver's hand and/or the gear shift knob 118. It is to be appreciated that the gear shifting region 116 can be included at various locations within the vehicle 102 based on the location of the gear shift lever. For example, the gear shifting region 116 can surround and include the gear shift lever 108 (that is mounted) at a front center console portion (not shown) of the vehicle 102 between a driver's side vehicle seat and a passenger's side vehicle seat. Alternatively the gear shifting region 116 can surround and include the gear shift lever 108 (that is mounted) at a dashboard (not shown) or steering column (not shown) of the vehicle 102.

Figure 2A:
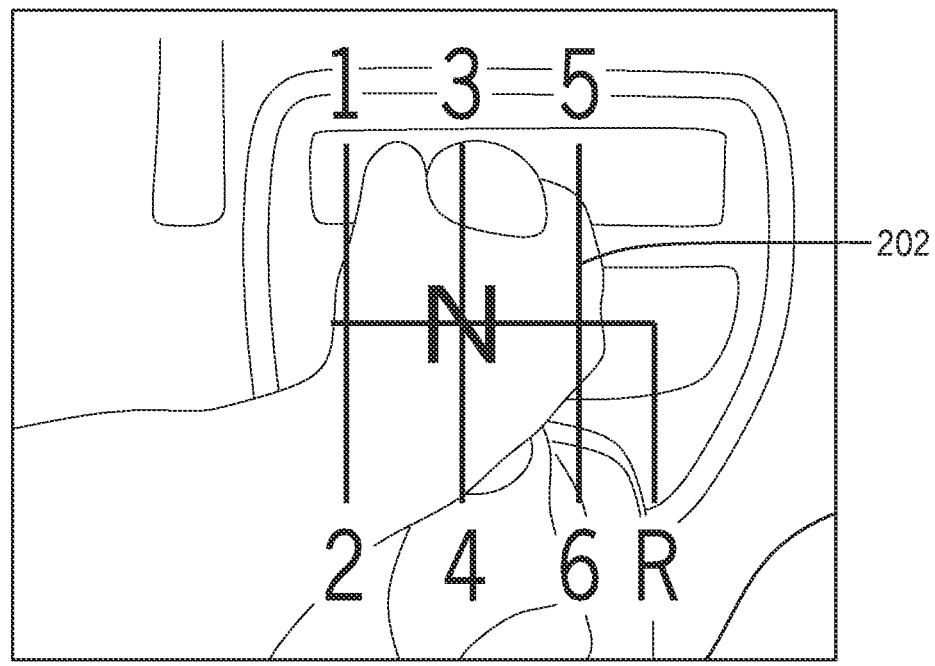
FIG. 2A is an illustrative view of an exemplary gear shift pattern that is associated to a gear shift lever from the operating environment of FIG. 1.

FIG. 2A an illustrative view of an exemplary gear shift pattern 202 that is associated to a gear shift lever 108 from the operating environment of FIG. 1. As shown in the exemplary embodiment of FIG. 2A, the plurality of gears of the transmission unit 104 includes seven gears (e.g., n=7) and the transmission unit 104 includes a gear shift pattern 202 that is associated with the gear shift lever 108. However, the gear shift pattern 202 can be configured in a variety of different formats to provide many types of patterns that can accommodate various numbers of gears (as represented by the exemplary gear shift patterns presented on the gear shift knobs of FIGS. 2C and 2D). The gear shift lever 108 can be utilized to select one or more respective gears based on the location of the gear shift lever 108 within the gear shift pattern 202. In other words, the gear shift pattern includes specific locations and/or positions (e.g., within grooves or notches) in which the gear shift lever 108 should be moved and positioned by the driver of the vehicle 102 to select one of the plurality of gears of the transmission unit 104.

Figure 2B:
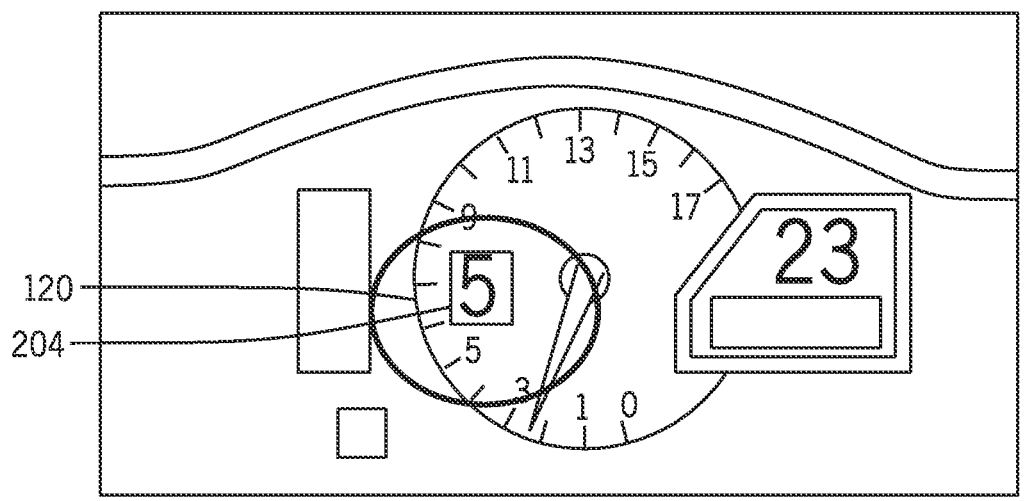
FIG. 2B is an illustrative view of an exemplary gear selection indicator that is presented on a tachometer display within the vehicle from the operating environment of FIG. 1.

FIG. 2B is an illustrative view of an exemplary gear selection indicator 120 that is presented on a tachometer display 204 within the vehicle 102 from the operating environment of FIG. 1. As shown, the gear selection indicator 120 can be included on a display screen/meter display as part of the tachometer display 204 that can present the currently selected gear of the transmission unit 104 in the form of numbers and/or characters. The gear selection indicator 120 can be operably connected for computer communication to the ECU 110 to be controlled by a component of the gear selection indication application 112 to present the currently selected gear of the transmission unit 104. As described in more detail below, the gear selection indication application 112 can operably control the gear selection indicator 120 to present the indication of the currently selected gear that is determined by the application 112 so that a driver of the vehicle 102 can quickly determine which gear the vehicle 102 is currently selected.

In alternative embodiments (not shown), the gear selection indicator 120 can be included as part of the head unit display, a heads up display, a rear view mirror display, a dashboard display, etc. In some embodiments, the gear selection indicator 120 can be included as part of a vehicle system interface (not shown). For example, the gear selection indicator 120 can be included as part of a vehicle navigation system user interface (not shown) that can present one or more details with respect to vehicle diagnostics. It is to be appreciated that additional embodiments of the gear selection indicator 120 can also be implemented with the systems and methods discussed herein.

Figure 2C:
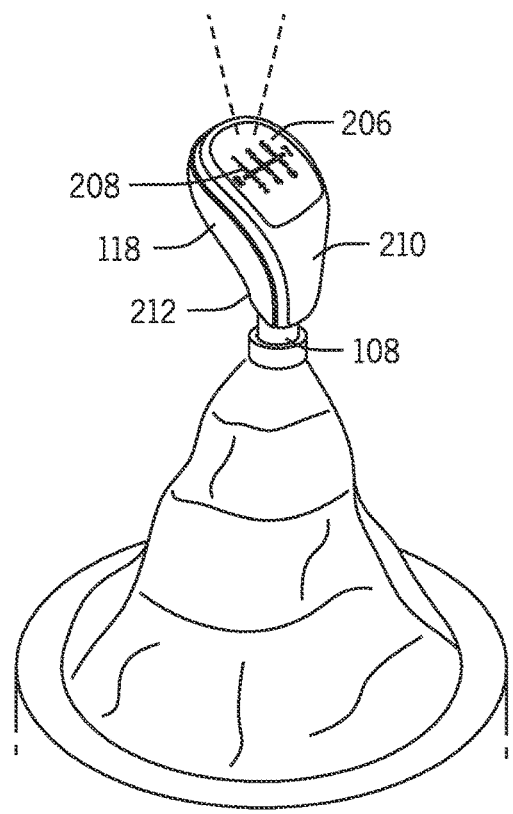
FIG. 2C is an schematic view of a gear shift lever from the operating environment of FIG. 1.

FIG. 2C is a schematic view of a gear shift lever 108 from the operating environment of FIG. 1. As shown in FIG. 2C, the gear shift knob 118 is disposed on the top portion of the gear shift lever 108 and forms a handle that can be grasped by the driver to select specific gears. The gear shift knob 118 can include a top facing portion 206 that is visible to the driver of the vehicle 102. In some embodiments, the gear shift knob 118 can additionally include a low-output infrared-emitting light source 208 (indicated by the dashed lines) (e.g., LED light source) that can include a daylight sensor (not shown). The daylight sensor of the low-output infrared-emitting light source 208 can detect when a predetermined level of light (e.g., a threshold) is not met and can activate the low-output infrared-emitting light source 208 to emit an infrared light in order for the gear selection indication application 112 to detect the location of the gear shift lever 108 during nighttime driving conditions.

In one or more embodiments, the gear shift lever 108 can include one or more gear shift touch sensors 210 that can be disposed at one or more portions of the gear shift knob 118 and/or other portions of the gear shift lever 108. The gear shift touch sensors(s) 210 can include capacitive sensors that can be utilized to determine when the driver (or other individual) touches the gear shift knob 118 and/or portions of the gear shift lever 108. Upon sensing that the driver has touched the gear shift knob 118 and/or portions of the gear shift lever 108, the gear shift touch sensor(s) 210 can provide one or more signals to the ECU 110 for the gear selection indication application 112 to utilize such information, as discussed in more detail below.

In one embodiment, the gear shift lever 108 can include one or more gear shift proximity sensors 212 that can be disposed at one or more portions of the gear shift knob 118, the gear shift lever 108, and/or the center console of the vehicle 102 disposed in the vicinity of the gear shift lever 108 (within the gear shifting region 116). The gear shift proximity sensor(s) 212 can sense when a portion of the driver's (or other individual's) body (e.g., arm, hand) comes within a certain predetermined distance (e.g., 0.3 m) of the gear shift lever 108. Upon sensing that a portion of the driver's body is located within the predetermined proximate distance of the gear shift lever 108, the gear shift proximity sensor(s) 212 can provide one or more signals to the ECU 110 for the gear selection indication application 112 to utilize such information, as discussed in more detail below.

Figure 2D:
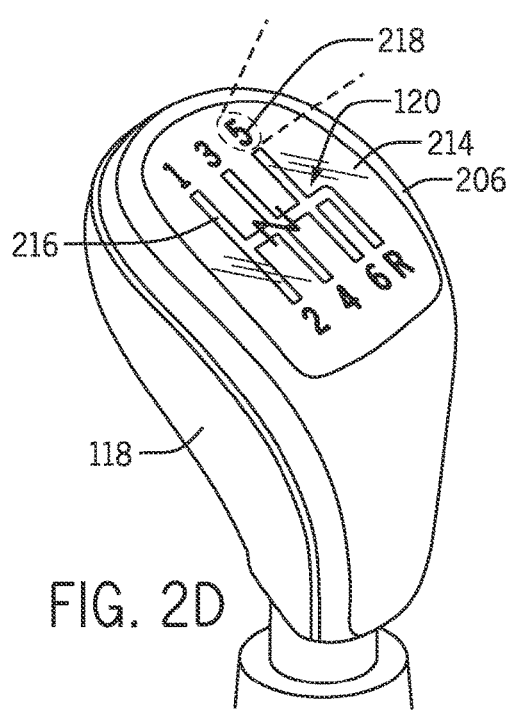
FIG. 2D is a schematic view of an exemplary gear selection indicator that is presented on a top facing portion of a gear shift knob from the operating environment of FIG. 1.

FIG. 2D is a schematic view of an exemplary gear selection indicator 120 that is presented on the top facing portion 206 of the gear shift knob 118 from the operating environment of FIG. 1. In one embodiment, in lieu of or in addition to the gear selection indicator 120 being included at other portions of the vehicle 102 (e.g., tachometer display 204), the gear selection indicator 120 can be included on the top facing portion 206 of the gear shift knob 118. The gear selection indicator 120 can present the currently selected gear of the transmission unit 104 in the form of numbers and/or characters.

In one embodiment, the gear selection indicator 120 can include a display screen 214 that is mounted on the top facing portion 206, or angled position (e.g., toward the driver) and can present a gear shift pattern indicia 216 that presents the gear shift pattern that is associated with the gear shift lever 108. In addition to presenting the gear shift pattern indicia 216, the display screen 214 can present a designation of the currently selected gear 218 as a gear selection indicator 120 of the transmission unit 104. For example, as shown in FIG. 2D, the currently selected fifth gear can be presented in a highlighted manner (indicated by the dashed lines) so that the driver can easily determine that the fifth gear is the currently selected gear while driving the vehicle 102. In an alternate embodiment, instead of presenting the gear shift pattern indicia 216 on the display screen 214, the gear selection indicator 120 can be presented as the currently selected gear as a standalone graphic (e.g., similar to the tachometer display 204 shown in FIG. 2B). The display screen 214 can optionally include vehicle/engine performance and/or vehicle feature details (e.g., vehicle speed, engine RPM, current exterior/interior temperature, etc.).

In some embodiments, the gear selection indicator 120 can be included directly on a surface of the top facing portion 206 (rather than via the display screen 214) and can include a light emitting gear shift pattern indicia (not shown). The light emitting gear shift pattern indicia can include one or more light sources (e.g., LED light sources) that can provide indication to the driver as to the currently selected gear of the transmission unit 104. It is to be appreciated that additional embodiments of the gear selection indicator 120 included at the gear shift knob 118 can be implemented with the systems and methods discussed herein.

Referring again to FIG. 1, in an exemplary embodiment, the vehicle camera system 114 can include a computing device that can be included as a separate hardware device (separate from the ECU 110) that can include a separate processor (not shown), memory (not shown), or other hardware (not shown). The vehicle camera system 114 can include one or more cameras that are configured to capture one or more images of the gear shifting region 116 within the vehicle 102. In one embodiment, the vehicle camera system 114 can execute preprogrammed camera logic that can be stored within the memory of the vehicle camera system 114 and/or the storage unit 126. The preprogrammed camera logic can be preprogrammed with one or more image profiles of specific objects within the vehicle 102. More specifically, the preprogrammed camera logic can be utilized by the vehicle camera system 114 to identify a presence and location of the driver's hand and/or a location of the gear shift knob 118 within the one or more captured images. The preprogrammed camera logic can also provide indications (e.g., in the form of data) of the identified location of the driver's hand and/or the identified location of the gear shift knob 118 within the image(s). As will be described below, the location of the driver's hand and/or the location of the gear shift knob 118 can be utilized by the gear selection indication application 112 to determine the currently selected gear of the plurality of gears of the transmission unit 104.

FIG. 3 is a schematic view of the vehicle 102 that includes one or more cameras 302, 304, 306, 308, 310 of the vehicle camera system 114 that are provided according to an aspect of the present application. In the exemplary embodiment shown, the one or more cameras 302, 304, 306, 308, 310 of the vehicle camera system 114 are located at various areas within a cabin of the vehicle 102. It is to be appreciated that the vehicle camera system 114 can include less, additional, and/or alternate cameras than the one or more cameras 302, 304, 306, 308, 310 illustrated within FIG. 3. Additionally it is to be appreciated that one or more cameras of the vehicle camera system 114 include specific types of cameras such as digital video capturing cameras, stereoscopic cameras, thermographic cameras, etc.

The one or more cameras 302, 304, 306, 308, 310 can be configured to capture images (e.g., still, video) of the gear shifting region 116 to capture the driver using the gear shift lever 108 in accordance with the associated gear shift pattern to select one of the plurality of gears of the transmission unit 104. In an exemplary embodiment, the vehicle camera system 114 can include a primary overhead center positioned camera (primary camera) 302 that is disposed directly or partially above the gear shifting region 116 (e.g., disposed directly above the gear shift knob 118). The primary overhead center positioned camera 302 can be configured to capture images the gear shift lever 108 within the gear shifting region 116 to capture the driver utilizing the gear shift lever 108 to select a gear from a central overhead position. The vehicle camera system 114 can additionally include one or more secondary cameras 304, 306, 308, 310 that can include, but are not limited to, a front-facing overhead positioned camera 304, a rear-facing overhead positioned camera 306, a rear-facing dashboard camera 308, and an under-dash camera 310. The front-facing overhead positioned camera 304 can be disposed directly or partially in a region towards the rear side of the vehicle 102, disposed behind of the gear shifting region 116 to capture images of the gear shifting region 116 from a front-facing overhead position. The rear-facing overhead positioned camera 306 can be disposed directly or partially in a region towards the front side of the vehicle 102, disposed ahead of the gear shifting region 116 (e.g., on a rear view mirror or ceiling) to capture images of the gear shifting region 116 from a rear-facing over head position. The rear-facing dashboard camera 308 can be disposed on a portion of the dashboard of the vehicle 102 to capture images of the gear shifting region 116 from a rear-facing lateral position that can be located directly ahead of the gear shifting region 116. The under-dash camera 310 can be disposed on an underneath portion of the dashboard 314 of the vehicle 102 (e.g., disposed directly or partially above a clutch pedal 312 and directly or partially ahead of and below the gear shift lever 108) to capture images of the gear shifting region 116 from an underneath position. Additionally, the under-dash camera 310 can be configured to capture images of the clutch pedal 312 of the vehicle 102 to capture the driver stepping on the clutch pedal 312 and actuating the clutch 106 when selecting one of the plurality of gears of the transmission unit 104.

II. The Gear Selection Indication Application

With reference again to FIG. 1, the gear selection indication application 112 will now be described in more detail according to an exemplary embodiment. In an exemplary embodiment, the gear selection indication application 112 can be stored on the storage unit 126 and executed by the ECU 110 and/or the head unit. In additional embodiments, the gear selection indication application 112 can be stored on memory of an external device (not shown) (e.g., of a mobile device) and executed by the ECU 110 and/or the head unit of the vehicle 102 via a computer communication medium (e.g., Bluetooth) between the ECU 110/head unit and the external device.

In an exemplary embodiment, the gear selection indication application 112 can include an image reception module 128, image processing module 130, a gear selection determinant module 132, and a gear selection output module 134. In an exemplary embodiment, the image reception module 128 can receive one or more images captured by the one or more cameras 302, 304, 306, 308, 302, 304, 306, 308, 310 of the vehicle camera system 114. As discussed above, the one or more cameras 302, 304, 306, 308, 310 can provide images of the gear shift lever 108 within the gear shifting region 116 from various angles based on the location of the one or more cameras 302, 304, 306, 308, 310 within the vehicle 102. As discussed in more detail below, the angles can be captured as specific values that correspond to the angle at which the image(s) of the gear shifting region 116 is captured.

In an exemplary embodiment, the image reception module 128 can utilize one or more techniques to perform a prediction that one of the plurality of gears of the transmission unit 104 may be selected. In other words, the image reception module 128 can utilize one or more techniques to predict when the driver of the vehicle 102 may use the gear shift lever 108 to select one of the plurality of gears of the transmission unit 104. In particular, the image reception module 128 can be configured to receive the one or more images from the vehicle camera system 114 when the image reception module 128 predicts that one of the plurality of gears of the transmission unit 104 may be selected. This functionality can limit the receiving and processing of one or more images by the gear selection indication application 112 to only relevant image(s) to ensure efficient determination of the currently selected gear by the application 112. Therefore, the gear selection indication application 112 may not have to utilize processing resources and/or unnecessary time to receive and process one or more images of the gear shifting region 116 that are irrelevant (e.g., images that do not include the shifting of the gear shift lever 108 by the driver of the vehicle 102) in determining the currently selected gear of the plurality of gears of the transmission unit 104.

Several embodiments will now be discussed with respect to the image reception module 128 predicting that one of the plurality of gears of the transmission unit 104 may be selected. It is to be appreciated that the image reception module 128 can combine one or more of the techniques utilized within the embodiments discussed below. In one embodiment, the image reception module 128 can be configured to communicate with the vehicle camera system 114 to receive an actuation signal when the one or more cameras 302, 304, 306, 308, 310 determine and provide indications (based on the preprogrammed camera logic executed by the vehicle camera system 114) that the driver's hand is located within the gear shifting region 116. The image reception module 128 can utilize the actuation signal communicated by the vehicle camera system 114 to predict that one of the plurality of gears of the transmission unit 104 may be selected. Upon receiving the actuation signal from the gear shift proximity sensor(s) 212, the image reception module 128 can be configured to receive the one or more images from the vehicle camera system 114.

In some embodiments, the image reception module 128 can be configured to communicate with the gear shift proximity sensor(s) 212 to receive an actuation signal upon the gear shift proximity sensor(s) 212 sensing that an object (e.g., the driver's hand) is within a predetermined proximity of the gear shift lever 108. The image reception module 128 can utilize the actuation signal communicated by the gear shift proximity sensor(s) 212 to predict that one of the plurality of gears of the transmission unit 104 may be selected. Upon receiving the actuation signal from the gear shift proximity sensor(s) 212, the image reception module 128 can be configured to receive the one or more images from the vehicle camera system 114.

In an alternate embodiment, the image reception module 128 can be configured to communicate with the gear shift touch sensor(s) 210 to receive an actuation signal upon the gear shift touch sensor(s) 210 sensing that a portion of the gear shift lever 108 (that can include the gear shift knob 118) has been touched. The image reception module 128 can utilize the actuation signal communicated by the gear shift touch sensor(s) 210 to predict that one of the plurality of gears of the transmission unit 104 may be selected. Upon receiving the actuation signal from the gear shift touch sensor(s) 210, the image reception module 128 can be configured to receive the one or more images from the vehicle camera system 114.

In one or more embodiments, the image reception module 128 can be configured to communicate with the vehicle sensor system 124 to receive one or more actuation signals that are utilized to predict that one of the plurality of gears of the transmission unit 104 may be selected. In one example, the image reception module 128 can receive an actuation signal from the vehicle clutch actuation sensor of the vehicle sensor system 124, upon the vehicle clutch actuation sensor detecting that the driver has actuated the clutch 106 (via the clutch pedal 312) of the vehicle 102. In another example, the image reception module 128 can receive the actuation signal from the vehicle speed sensors when the vehicle speed sensors detect that one or more predetermined speed thresholds are met that correspond to the changing of a certain gear to predict that the driver may select the gear. Similarly, in another example, the image reception module 128 can receive the actuation signal from the vehicle RPM sensors when the vehicle RPM sensors detect that predetermined RPM value thresholds are met that correspond to the changing of a certain gear to predict that the driver may select the gear. It is to be appreciated that the additional techniques to predict selection of one of the plurality of gears of the transmission unit 104 can be implemented with the systems and methods discussed herein.

In one or more embodiments, upon predicting that one of the plurality of gears of the transmission unit 104 may be selected, the image reception module 128 can receive one or more images from the vehicle camera system 114 that were captured from the primary camera 302. Upon receiving the image(s) captured from the primary camera 302 from the vehicle camera system 114, the image reception module 128 can determine if the one or more of the images captured by the primary camera 302 include an altered view of the gear shifting region 116. For example, an object (e.g., a passenger's arm, a physical object) can alter (e.g., obstruct) the view of the primary camera 302 while capturing images of the gear shifting region 116. In another example, excessive light glare and/or excessive vehicle vibration can alter the view of the primary camera 302 while capturing images of the gear shifting region 116.

If the image reception module 128 determines that the image(s) captured by the primary camera 302 includes an unaltered view of the gear shifting region 116, the image reception module 128 can further select the image(s) captured by the primary camera 302 (received from vehicle camera system 114) to be sent to the image processing module 130 to be further processed. However, if the image reception module 128 determines that the image(s) captured by the primary camera 302 does include an altered view of the gear shifting region 116, the image reception module 128 can disregard the image(s) received from the vehicle camera system 114 so that the image(s) with altered views of the gear shifting region 116 are not processed. The image reception module 128 can also communicate a signal to the vehicle camera system 114 to enable the primary camera 302 to recapture one or more images of the gear shifting region 116 to be further received by the image reception module 128.

In some embodiments, in the event that the image(s) captured by the primary camera 302 include an altered view of the gear shifting region 116, the image reception module 128 can be configured to further evaluate one or more images received from the vehicle camera system 114 that were captured by the one or more secondary cameras 304, 306, 308, 310. In one example, if the vehicle camera system 114 includes only one secondary camera that captured images of the gear shifting region 116, the image reception module 128 can evaluate the image(s) captured by the secondary camera to determine if the image includes an unaltered view of the gear shifting region 116. If the image reception module 128 determines that the image(s) captured by the secondary camera includes an unaltered view of the gear shifting region 116, the image reception module 128 can further select the image(s) captured by the secondary camera (received from vehicle camera system 114) to be sent to the image processing module 130 to be further processed. However, if the image reception module 128 determines that the image(s) captured by the secondary camera does not provide an unaltered view of the gear shifting region 116, the image reception module 128 can communicate a signal to the vehicle camera system 114 to recapture one or more images of the gear shifting region 116 with the primary camera 302 and/or the secondary camera until one or more unaltered images of the gear shifting region 116 are received from the vehicle camera system 114.

In another example, if the vehicle camera system 114 includes more than one secondary camera that capture images of the gear shifting region, the image reception module 128 can designate one of the secondary cameras as a designated secondary camera. In other words, the image reception module 128 can receive image(s) of the gear shifting region 116 from the vehicle camera system 114 that were specifically captured by the designated secondary camera. If the image reception module 128 determines that the image(s) captured by the designated secondary camera includes an unaltered view of the gear shifting region 116, the image reception module 128 can further select the image(s) captured by the designated secondary camera (received from vehicle camera system 114) to be sent to the image processing module 130 to be further processed. However, if the image processing module 130 determines that the image(s) captured by the predetermined designated secondary camera do not provide an unaltered view of the gear shifting region 116, the image processing module 130 can communicate a signal to the vehicle camera system 114 to recapture one or more images of the gear shifting region with another secondary camera, with the primary camera 302, or with the predetermined designated secondary camera until one or more unaltered images of the gear shifting region 116 are received from the vehicle camera system 114.

In one or more embodiments, upon determining the image(s) of the gear shifting region 116 received from the vehicle camera system 114 are unaltered, the image reception module 128 can send the image(s) to the image processing module 130 to process data from the image(s) into processed image data. In particular, during the processing of data from the image(s) the image processing module 130 can analyze the image(s) of the gear shifting region 116 to detect an image capturing angle and one or more associated sets of image spatial coordinates. The image capturing angle can be assigned to the image(s) that are processed by the image processing module 130 and can include a value that represents an angle between the respective camera(s) that captures the image(s) of the gear shifting region 116 and a specific portion on the gear shifting region 116 (e.g., a neutral position of the gear shift lever 108). The one or more sets of image spatial coordinates can include coordinate values of the image(s) that represent the location of one or more pixels of the image that include the location of the driver's hand and/or the location of the gear shift knob 118 included within the image(s). The location of the driver's hand and/or the location of the gear shift knob within the image(s) can be provided to the image processing module 130 as indications (e.g., in the form of data) within the image(s) received by the image reception module 128 from the vehicle camera system 114 based on the utilization of the camera logic.

In one embodiment, the image processing module 130 can detect the image capturing angle (e.g., 60 degrees) of the image(s) based off of the determined angle (value) between the camera (e.g., primary or secondary camera) capturing the image of the gear shifting region 116 processed by the image processing module 130 and the specific location of the gear shifting region 116 (e.g., a neutral position of the gear shift lever 108). The image processing module 130 can further detect one or more sets of image spatial coordinates (e.g., one or more sets of x,y coordinates) that represent the location of the one or more pixels of the image(s) that include the location of the driver's hand and/or the location of the gear shift knob within the image(s).

Upon detecting the image capturing angle and the one or more sets of image spatial coordinates, the image processing module 130 can associate the image capturing angle with the one or more sets of image spatial coordinates and can process the associated data into processed image data. In other words, the one or more sets of image spatial coordinates that represent the location of the one or more pixels of the image that include the location of the driver's hand and/or the location of the gear shift knob 118 within the image (as shown within the gear shifting region 116) will differ based on the image capturing angle (based on the location of the camera capturing the image with respect to the specific location of the gear shifting region 116). Therefore, the image processing module 130 associates the one or more sets of image spatial coordinates to the respective image capturing angle. For example, the image processing module 130 can determine the image capturing angle (e.g., 90 degrees) of the image(s) based off of the determined angle between the primary camera 302 capturing the image of the gear shifting region 116 and the neutral position of the gear shift lever 108. Additionally, the image processing module 130 can determine the one or more sets of image spatial coordinates that represent the location of one or more pixels of the image that include the location of the driver's hand and/or the location of the gear shift knob within the image(s) received from the primary camera 302. It is to be appreciated that additional techniques can be utilized by the image processing module 130 to process the image(s) into processed image data.

In an exemplary embodiment, upon processing the image data, the image processing module 130 can send the processed image data to the gear selection determinant module 132 to be further analyzed. The gear selection determinant module 132 can analyze the processed image data provided by the image processing module 130 to determine the currently selected gear of the plurality of gears of the transmission unit 104.

In an exemplary embodiment, upon receiving the image data from the image processing module 130, the gear selection determinant module 132 can access a gear shift pattern recognition logic from the storage unit 126 to analyze the processed image data provided by the image processing module 130. The gear selection determinant module 132 can utilize the gear shift pattern recognition logic to evaluate the image to determine the position of the driver's hand and/or the gear shift lever 108 within the gear shift pattern associated with the gear shift lever 108 (corresponding with the make and model of the vehicle 102). The gear selection determinant module 132 can further utilize the gear shift pattern recognition logic to determine a gear selection based on the determined position of the driver's hand and/or the gear shift lever 108 within the gear shift pattern.

More specifically, the gear shift pattern recognition logic can be preprogrammed with the gear shift pattern associated with the gear shift lever 108 that corresponds to the specific make and mode of the vehicle 102. The gear shift pattern recognition logic can also include preprogrammed image spatial coordinates (e.g., one or more sets of x,y coordinates) that represent the location of one or more pixels of the image where each of the gears of the transmission unit 104 can be selected within the image(s), based on the gear selection pattern. In other words, the preprogrammed image spatial coordinates represent specific predetermined locations of the image that correspond to the locations where each of the gears can be selected within the gear shift pattern (e.g., within grooves or notches) of the vehicle 102 (e.g., locations within the gear shift pattern where the R, $1^{st}$, $2^{nd}$, $3^{rd}$, $4^{th}$ etc. gears can be selected by the driver utilizing the gear shift lever 108 to select gears).

As an illustrative example, the gear shift pattern recognition logic can include the image capturing angles of the image(s) (e.g., 90 degrees) of the gear shifting region captured by the primary camera 302. Additionally, the gear shift pattern recognition logic can include preprogrammed spatial image coordinates that are associated to the image capturing angle of the image(s) of the gear shifting region 116 captured by the primary camera 302 that represents the location of one or more pixels of the image(s) wherein each of the plurality of gears (R, $1^{st}$, $2^{nd}$, $3^{rd}$, $4^{th}$, etc.) of the transmission unit 104 can be selected as per the gear selection pattern.

In an exemplary embodiment, upon receiving the processed image data from the image processing module 130, the gear selection determinant module 132 can extract the image capturing angle and the image spatial coordinates from the processed image data. The gear selection determinant module 132 can then utilize the gear shift pattern recognition logic to analyze the image capturing angle extracted from the processed data against one or more preprogrammed image captured angles to determine a match between the image capturing angle extracted from the processed image data and the preprogrammed image capturing angles.

Upon determining a match between the image capturing angle extracted from the processed image data and the preprogrammed image capturing angles, the gear selection determinant module 132 can compare the set of spatial image coordinates associated with the image capturing angle extracted from the processed image spatial coordinates against preprogrammed sets of spatial image coordinates associated with the matching preprogrammed image capturing angle to determine if there is a match between the set of spatial image coordinates extracted from the processed image data and the preprogrammed sets of spatial image coordinates (identified from the gear shift pattern recognition logic).

Specifically, the gear selection determinant module 132 can evaluate the extracted image spatial coordinates with respect to the preprogrammed coordinates to determine where the location of the driver's hand and/or the gear shift knob within the image(s) is positioned as compared to preprogrammed sets of image spatial coordinates that are associated to the location of the image wherein each of the plurality of gears of the transmission unit 104 can be selected as per the gear selection pattern. Upon completing the comparison between the extracted set(s) of image spatial coordinates and the preprogrammed sets of image spatial coordinates that are both associated to the matching (extracted and programmed) image capturing angle, the gear selection determinant module 132 can determine if the driver of the vehicle 102 has selected one of the gears of the transmission unit 104 based on if the extracted image coordinates match any of the preprogrammed image coordinates. In one embodiment, if the gear selection determinant module 132 determines that there is a match between extracted image coordinates match and the preprogrammed image coordinates, the gear selection determinant module 132 can further determine the currently selected gear of the plurality of gears of transmission unit 104. This determination can take place based on the gear that is identified within the gear shift pattern of the gear shift pattern recognition logic at the location of the matching preprogrammed image coordinates.

In some embodiments, after determining the currently selected gear, the gear selection determinant module 132 can validate the currently selected gear to ensure that the determination is accurate. In one embodiment, when the vehicle camera system 114 includes more than one camera, the gear selection determinant module 132 can send a signal to the image processing module 130 to provide processed image data based on image(s) received from an alternate camera that includes a different image capturing angle than from the image(s) that were utilized. The gear selection determinant module 132 can then extract the image capturing angle and the set(s) of image spatial coordinates (of the driver's hand and/or the gear shift knob 118) from the processed image data based on the image(s) received from the alternate camera and compare the extracted set(s) of image spatial coordinates to the preprogrammed sets of image spatial coordinates for the respective associated image capturing angle to the validate the determination of the currently selected gear.

In an another embodiment, the gear selection determinant module 132 can communicate with the one or more vehicle systems and/or the vehicle sensor system to validate the determined currently selected gear of the transmission unit 104 of the vehicle 102. In one example, if the gear selection determinant module 132 determines that the currently selected gear is the reverse gear of the vehicle 102, the gear selection determinant module 132 can communicate with the vehicle lighting system of the vehicle systems 122 (via the ECU 110) to confirm if reverse lights of the vehicle lighting system have been actuated. In another example, the gear selection determinant module 132 can communicate with the vehicle speed sensors to detect if one or more predetermined speed thresholds are met that correspond to the changing to the determined currently selected gear. It is to be appreciated that the gear selection determinant module 132 can communicate with one or more additional vehicle systems and/or sensors to validate the currently selected gear of the transmission unit 104. In some embodiments, if the gear selection determinant module 132 can not successfully validate the determined currently selected gear, the gear selection determinant module 132 can send a signal to the image processing module 130 to once again receive one or more images and provide respective processed image data to the gear selection determinant module 132.

In an exemplary embodiment, upon determining the currently selected gear, the gear selection determinant module 132 can further communicate the determined currently selected gear to the gear selection output module 134. In one or more embodiments, upon receiving the determined currently selected gear from the gear selection determinant module 132, the gear selection output module 134 can communicate the determined currently selected gear to the gear selection indicator 120. More specifically, the gear selection output module 134 can utilize the ECU 110 to send the determined currently selected gear as a data signal to the gear selection indicator 120 to be presented to the driver of the vehicle 102 at one or more locations of the vehicle 102. Upon receiving the data signal, the gear selection indicator 120 can present the determined currently selected gear as feedback of the gear selection to the driver of the vehicle 102.

In some additional embodiments, the gear selection output module 134 can also communicate the determined currently selected gear to the vehicle systems 122. More specifically, the gear selection output module 134 can utilize the ECU 110 to send the determined currently selected gear as a data signal to the vehicle systems 122. For example, the currently selected gear can be utilized by vehicle systems 122 such as a vehicle gear selection timing system that can provide the driver with an indication via the gear selection indicator 120 informing the driver that a different gear should be selected in order to enhance the operation of the vehicle 102 and minimize damage to the manual transmission 104.

III. Exemplary Methods Utilized by the Gear Selection Indication Application

Figure 4:
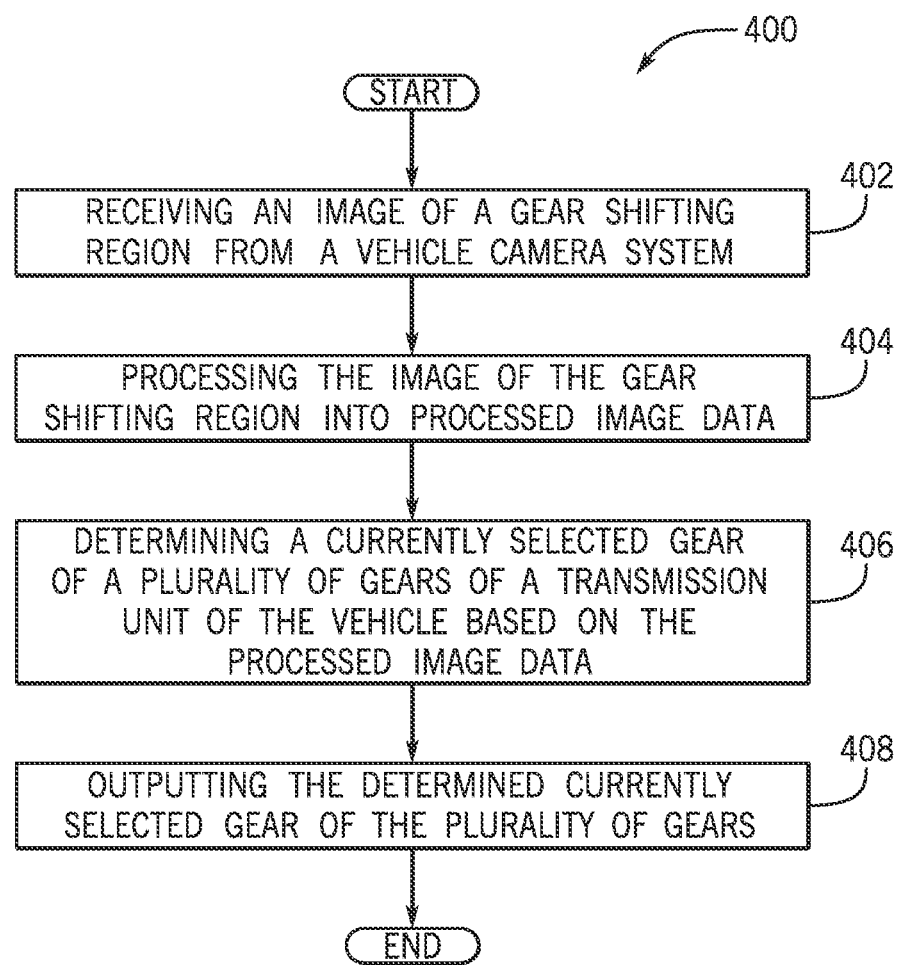
FIG. 4 is a process flow diagram of a method for providing a gear selection indication executed by the gear selection indication application from the operating environment of FIG. 1 according to an exemplary embodiment.

FIG. 4 is a process flow diagram of a method 400 for providing a gear selection indication executed by the gear selection indication application 112 from the operating environment of FIG. 1 according to an exemplary embodiment. FIG. 4 will be described with reference to the components of FIGS. 1-3, though it is to be appreciated that the method 400 of FIG. 4 can be used with additional and/or alternate system components. At block 402, the method includes receiving an image of a gear shifting region 116 from a vehicle camera system 114. At block 404, the method includes processing the image of the gear shifting region 116 into processed image data.

Figure 5:
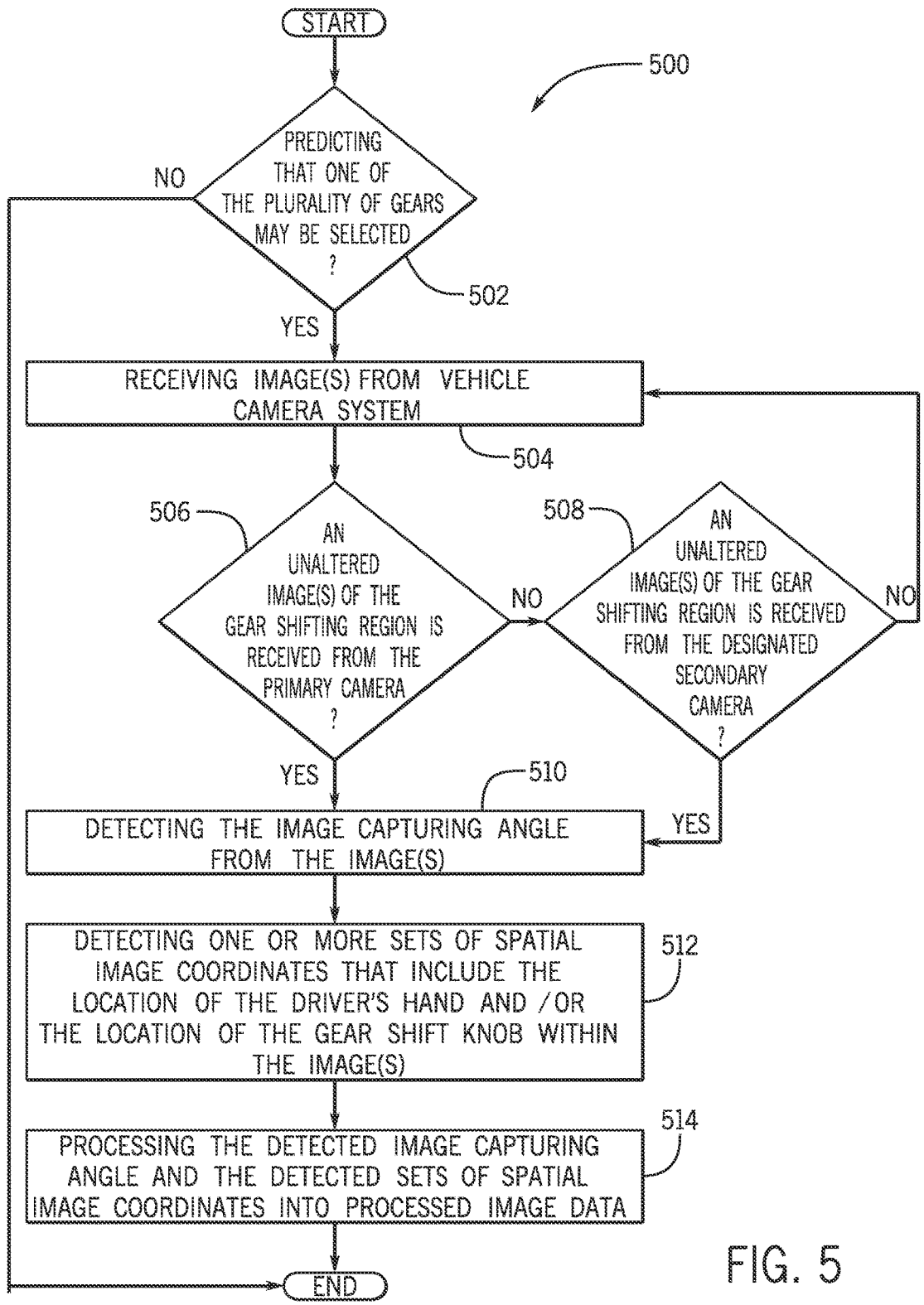
FIG. 5 is a process flow diagram of a method for receiving an image of a gear shifting region and processing the image of the gear shifting region into processed image data from the operating environment of FIG. 1 according to an exemplary embodiment.

FIG. 5 is a process flow diagram of a method 500 for receiving the image of the gear shifting region 116 and processing the image of the gear shifting region 116 into processed image data from the operating environment of FIG. 1 according to an exemplary embodiment. At block 502, the method includes predicting that one of the plurality of gears may be selected. As discussed above, in an exemplary embodiment, the image processing module 130 can utilize one or more techniques to predict that the driver of the vehicle 102 may use the gear shift lever 108 to select one of the plurality of gears of the transmission unit 104.

If it is predicted that one of the plurality of gears may be selected (at block 502), at block 504, the method includes receiving image(s) from the vehicle camera system 114. Specifically, the image processing module 130 can be configured to receive the one or more images from the camera(s) 302, 304, 306, 308, 310 based on the prediction that the driver may use the gear shift lever 108 to select a gear of the transmission unit 104. In other words, upon predicting the driver may use the gear shift lever 108 to select one of the plurality of gears of the transmission unit 104, the image processing module 130 can receive one or more image(s) from the camera(s) 302, 304, 306, 308, 310.

At block 506, the method includes determining if an unaltered image(s) of gear shifting region 116 is received from the primary camera 302. As discussed above, in one embodiment, the image processing module 130 can be configured to receive one or more images of the gear shifting region 116 from the primary camera 302. Upon receiving the image(s) from the primary camera 302, the image processing module 130 can determine if one or more of the images provided by the primary camera 302 include an altered view of the gear shifting region 116. In other words, the image processing module 130 can determine that one or more images of the gear shifting region does not include an object that can obstruct the view of the primary camera 302 while capturing the image(s) of the gear shifting region 116. Additionally, the image processing module 130 can determine that one or more images of the gear shifting region 116 are not altered due to excessive light glare and/or excessive vehicle vibration that affect the primary camera 302 while capturing the image(s) of the gear shifting region 116.

If it is determined that an unaltered image(s) of the gear shifting region is not received from the primary camera 302 (at block 506), at block 508, the method includes determining if an unaltered image(s) of the gear shifting region 116 is received from the designated secondary camera. As discussed, when the vehicle camera system 114 includes more than one secondary camera, the image processing module 130 can utilize one of the secondary cameras as a predetermined designated secondary camera to receive one or more images of the gear shifting region 116 and further determine if one or more of the images provided by the designated secondary camera includes an unaltered view of the gear shifting region 116.

If it is determined that an unaltered image(s) of the gear shifting region is not received from the designated secondary camera (at block 508), the method returns to block 504, wherein the method once again includes receiving image(s) from the vehicle camera system 114. In one embodiment, if the image processing module 130 determines that the image(s) provided by the designated secondary camera do not provide an unaltered view of the gear shifting region 116, the image processing module 130 can communicate a signal to the vehicle camera system 114 to recapture one or more images of the gear shifting region 116 with the primary camera 302 in order for the image processing module 130 to receive a new image(s) from the vehicle camera system 114.

If it is determined that an unaltered image(s) of the gear shifting region is received from the primary camera 302 (at block 506) or from the designated secondary camera (at block 508), the method includes detecting the image capturing angle from the image(s). The image processing module 130 can be configured to detect the image capturing angle from the received image(s) of the gear shifting region 116. As described above, the image processing module 130 can detect the image capturing angle as a value of the angle between the respective camera(s) capturing the image(s) of the gear shifting region 116 and a specific portion on the gear shifting region 116.

At block 512, the method includes detecting one or more sets of image spatial coordinates that include the location of the driver's hand and/or the location of the gear shift knob 118 within the image(s). In one embodiment, the image processing module 130 can detect one or more sets of image spatial coordinates (e.g., one or more sets of x,y coordinates) that represent the location of one or more pixels that include the location of the driver's hand and/or the location of the gear shift knob within the image(s) that were identified by the vehicle camera system 114 via the preprogrammed camera logic, as discussed above.

At block 514, the method includes processing the detected image capturing angle and the detected sets of image spatial coordinates into processed image data. In an exemplary embodiment, upon detecting the image capturing angle and the sets of image spatial coordinates (at blocks 510 and 512), the image processing module 130 can associate the image capturing angle with the sets of image spatial coordinates and process the combined data into processed image data.

Figure 6:
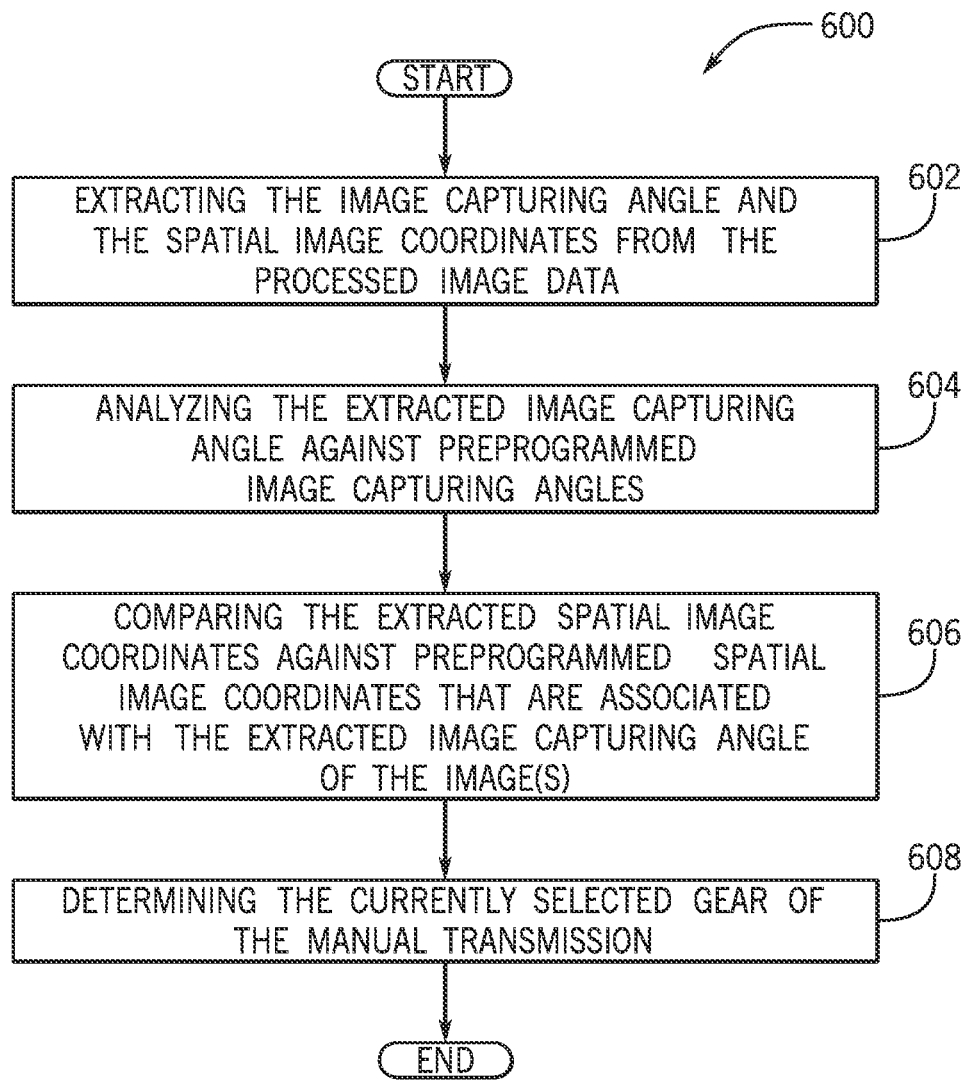
FIG. 6 is a process flow diagram of a method for determining a currently selected gear based on the processed image data from the operating environment of FIG. 1 according to an exemplary embodiment.

Referring back to FIG. 4, at block 406, the method includes determining a currently selected gear of a plurality of gears of a transmission unit of the vehicle based on the processed image data. FIG. 6 is a process flow diagram of a method 600 for determining a currently selected gear based on the processed image data from the operating environment of FIG. 1 according to an exemplary embodiment. At block 602, the method includes extracting the image capturing angle and one or more sets of image spatial coordinates from the processed image data. In one embodiment, the gear selection determinant module 132 can extract the image capturing angle as an extracted image capturing angle and the set(s) of image spatial coordinates from the processed image data.

At block 604, the method includes analyzing the extracted image capturing angle against preprogrammed image capturing angles. More specifically, the gear selection determinant module 132 can utilize the gear shift pattern recognition logic to analyze the extracted image capturing angle against one or more preprogrammed image captured angles to determine a match between the extracted image capturing angle and the preprogrammed image capturing angle.

At block 606, the method includes comparing the extracted spatial image coordinates against preprogrammed spatial image coordinates that are associated with the extracted image capturing angle of the image(s). In one embodiment, the gear selection determinant module 132 utilizes the gear shift pattern recognition logic to compare the extracted set(s) of image spatial coordinates with preprogrammed sets of image spatial coordinates that are associated with the extracted image capturing angle of the image(s). More specifically, upon determining a match between the extracted image capturing angle and one or more preprogrammed image capturing angles, the gear selection determinant module 132 can determine sets of programmed spatial coordinates that are associated to the matching preprogrammed image capturing angle/extracted image capturing angle. The gear selection determinant module 132 can compare the extracted image spatial coordinates to the preprogrammed coordinates to determine a match. The extracted image spatial coordinates correspond to the location of the driver's hand and/or the gear shift knob 118 within the image(s) as compared to preprogrammed sets of image spatial coordinates that are associated to the location of the image where each of gears of the transmission unit 104 can be selected in accordance with the gear selection pattern.

At block 608, the method includes determining the currently selected gear of the manual transmission. Upon determining a match between the one or more sets of extracted image spatial coordinates and preprogrammed sets of image spatial coordinates, the gear selection determinant module 132 utilizes the gear shift pattern recognition logic to determine the currently selected gear of the transmission unit 104.

Referring again to FIG. 4, at block 408, the method includes outputting the determined currently selected gear. In one embodiment, upon determining the currently selected gear, the gear selection determinant module 132 can communicate the currently selected gear to the gear selection output module 134. The gear selection output module 134 can utilize the ECU 110 to send the currently selected gear as a data signal to the gear selection indicator 120 to be presented to the driver of the vehicle 102 at one or more locations of the vehicle 102. Upon receiving the data signal, the gear selection indicator 120 can present the currently selected gear to the driver of the vehicle 102 as feedback of the gear selection to the driver. In another embodiment, the gear selection output module 134 can utilize the ECU 110 to send the currently selected gear as a data signal to the vehicle systems 122 to be used to provide one or more functions.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules or other data. Non-transitory computer readable storage media excludes transitory and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also indented to be encompassed by the following claims.

The invention claimed is:

1. A method for providing a gear selection indication for a vehicle comprising:
   receiving an image of a gear shifting region of the vehicle from a vehicle camera system;
   processing the image of the gear shifting region into processed image data;
   determining a currently selected gear of a plurality of gears of a transmission unit of the vehicle based on the processed image data; and
   outputting the currently selected gear of the plurality of gears,
   wherein outputting the determined currently selected gear includes at least one of: communicating the currently selected gear to a gear selection indicator that presents the determined currently selected gear and communicating the currently selected gear to vehicle systems.

2. The method of claim 1, wherein receiving the image of the gear shifting region includes predicting that one of the plurality of gears may be selected, wherein predicting that one of the plurality of gears may be selected includes receiving an actuation signal from the vehicle camera system when a driver's hand is determined to be located within the gear shifting region.

3. The method of claim 1, wherein receiving the image of the gear shifting region includes receiving the image of the gear shifting region captured by at least one of: a primary camera of the vehicle camera system, or a secondary camera of the vehicle camera system.

4. The method of claim 3, wherein receiving the image of the gear shifting region includes: determining if an unaltered image of the gear shifting region is received from the vehicle camera system and selecting at least one of: the image of the gear shifting region captured by the primary camera if it is determined that the unaltered image of the gear shifting region is captured by the primary camera, or selecting the image of the gear shifting region captured by the secondary camera to be further processed if it is determined that an altered image of the gear shifting region is captured by the primary camera and the unaltered image of the gear shifting region is captured by the secondary camera.

5. The method of claim 4, wherein processing the image of the gear shifting region includes analyzing the image received from the vehicle camera system to detect an image capturing angle from the image, wherein the image capturing angle includes a value that represents an angle between at least one of: the primary camera that captures the image of the gear shifting region and a specific portion of the gear shifting region, or the secondary camera that captures the image of the gear shifting region and the specific portion of the gear shifting region.

6. The method of claim 5, wherein processing the image of the gear shifting region includes analyzing the image received from at least one of: the primary camera, or the secondary camera to detect a set of spatial image coordinates, wherein the set of spatial image coordinates represent a location of one or more pixels of the image that include a driver's hand and/or a location of the gear shift knob within the image, wherein the image capturing angle is associated to the set of spatial image coordinates and processed into the processed image data.

7. The method of claim 6, wherein determining the currently selected gear includes extracting the image capturing angle from the processed image data, wherein the image capturing angle extracted from the processed image data is compared against preprogrammed image capturing angles to determine a match between the image capturing angle extracted from the processed image data and the preprogrammed image capturing angles.

8. The method of claim 7, wherein determining the currently selected gear includes extracting the set of spatial image coordinates associated with the image capturing angle from the processed image data, wherein the set of spatial image coordinates associated with the image capturing angle extracted from the processed image data is compared against preprogrammed sets of spatial image coordinates that are associated with the preprogrammed image capturing angle to determine if there is a match between the set of spatial image coordinates extracted from the processed image data and the preprogrammed sets of spatial image coordinates, wherein the preprogrammed sets of spatial image coordinates represent the location of one or more pixels of the image where each of the gears of the plurality of gears can be selected within the image based on a gear shift pattern.

9. The method of claim 8, wherein determining the currently selected gear includes determining the match between the set of spatial image coordinates and the preprogrammed sets of spatial image coordinates and identifying one of the plurality of gears within the gear shift pattern at a location of the image that represents the set of spatial image coordinates extracted from the processed image data and the preprogrammed sets of spatial image coordinates.

10. A system for providing a gear selection indication for a vehicle comprising:
   a gear selection indication application that is executed on an electronic control unit of the vehicle;
   an image reception module that is included as a module of the gear selection indication application that receives an image of a gear shifting region of the vehicle from a vehicle camera system;
   an image processing module that is included as a module of the gear selection indication application that processes the image of the gear shifting region into processed image data;
   a gear selection determinant module that is included as a module of the gear selection indication application that determines a currently selected gear of a plurality of gears of a transmission unit of the vehicle based on the processed image data; and
   a gear selection output module that is included as a module of the gear selection indication application that outputs the currently selected gear of the plurality of gears,
      wherein the gear selection output module communicates the currently selected gear to at least one of: a gear selection indicator that presents the determined currently selected gear and to vehicle systems.

11. The system of claim 10, wherein the image reception module predicts that one of the plurality of gears may be selected, wherein predicting that one of the plurality of gears may be selected includes receiving an actuation signal from the vehicle camera system when a driver's hand is determined to be located within the gear shifting region.

12. The system of claim 11, wherein the image reception module receives an image of the gear shifting region captured by at least one of: a primary camera of the vehicle camera system, or a secondary camera of the vehicle camera system.

13. The system of claim 12, wherein the image reception module determines if an unaltered image of the gear shifting region is received from the vehicle camera system and selects at least one of: the image of the gear shifting region captured by the primary camera to be further processed if it is determined that the unaltered image of the gear shifting region is captured by the primary camera, or the image of the gear shifting region captured by the secondary camera to be further processed if it is determined that an altered image of the gear shifting region is captured by the primary camera and the unaltered image of the gear shifting region is captured by the secondary camera.

14. The system of claim 13, wherein the image processing module analyzes the image received from the vehicle camera system to detect an image capturing angle from the image, wherein the image capturing angle includes a value that represents an angle between at least one of: the primary camera and a specific portion of the gear shifting region, and the secondary camera and the specific portion of the gear shifting region.

15. The system of claim 14, wherein the image processing module analyzes the image received from at least one of the: primary camera, or the secondary camera to detect a set of spatial image coordinates, wherein the set of spatial image coordinates represent the location of one or more pixels of the image that include the driver's hand and/or the location of the gear shift knob within the image, wherein the image capturing angle is associated to the set of spatial image coordinates and processed into processed image data.

16. The system of claim 15, wherein the gear selection determinant module extracts the image capturing angle from the processed image data, wherein the image capturing angle extracted from the processed image data is compared against preprogrammed image capturing angles to determine a match between the image capturing angle extracted from the processed image data and the preprogrammed image capturing angles.

17. The system of claim 16, wherein the gear selection determinant module extracts the set of spatial image coordinates associated with the image capturing angle from the processed image data, wherein the set of spatial image coordinates associated with the image capturing angle extracted from the processed image data is compared against preprogrammed sets of spatial image coordinates that are associated with the preprogrammed image capturing angle to determine if there is a match between the set of spatial image coordinates extracted from the processed image data and the preprogrammed sets of spatial image coordinates, wherein the preprogrammed sets of spatial image coordinates represent the location of one or more pixels of the image where each of the gears of the plurality of gears can be selected within the image based on a gear shift pattern.

18. The system of claim 17, wherein the gear selection determinant module determines a match between the set of spatial image coordinates extracted from the processed image data and the preprogrammed sets of spatial image coordinates and identifies one of the plurality of gears within the gear shift pattern at a location of the image that represents the set of spatial image coordinates extracted from the processed image data and the preprogrammed sets of spatial image coordinates.

19. A non-transitory computer-readable storage medium storing instructions that when executed by a processor performs actions, comprising:
    receiving an image of a gear shifting region of a vehicle from a vehicle camera system;
    processing the image of the gear shifting region into processed image data;
    determining a currently selected gear of a plurality of gears of a transmission unit of the vehicle based on the processed image data; and
    outputting the currently selected gear of the plurality of gears,
        wherein outputting the determined currently selected gear includes at least one of: communicating the currently selected gear to a gear selection indicator that presents the determined currently selected gear, and communicating the currently selected gear to vehicle systems.

20. The computer readable storage medium of claim 19, wherein determining the currently selected gear includes extracting a set of spatial image coordinates associated with an image capturing angle from the processed image data, wherein the set of spatial image coordinates associated with the image capturing angle extracted from the processed image data is compared against preprogrammed sets of spatial image coordinates that are associated with a preprogrammed image capturing angle to determine if there is a match between the set of spatial image coordinates extracted from the processed image data and the preprogrammed sets of spatial image coordinates, wherein the preprogrammed sets of spatial image coordinates represent the location of one or more pixels of the image where each of the gears of the plurality of gears can be selected within the image based on a gear shift pattern.

\* \* \* \* \*